United States Patent
Schindler

(10) Patent No.: US 6,466,241 B1
(45) Date of Patent: *Oct. 15, 2002

(54) METHOD AND APPARATUS FOR MANAGING PROGRAM ACTIVATION THROUGH USE OF A FAVORITE PROGRAM BUTTON MENU

(75) Inventor: Jeffrey Schindler, Sioux City, IA (US)

(73) Assignee: Gateway, Inc., North Sioux City, SD (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1048 days.

(21) Appl. No.: 08/626,504

(22) Filed: Apr. 2, 1996

Related U.S. Application Data

(63) Continuation-in-part of application No. 08/502,882, filed on Jul. 17, 1995.

(51) Int. Cl.⁷ .................................................. G06F 3/00
(52) U.S. Cl. ...................................... 345/854; 345/716
(58) Field of Search .................................. 395/348, 352, 395/353, 354, 356, 333, 334, 357; 345/326, 352, 353, 354, 333, 356, 357, 700, 810, 841, 840, 762, 854, 853

(56) References Cited

U.S. PATENT DOCUMENTS

| | | | |
|---|---|---|---|
| 4,527,194 A | 7/1985 | Sirazi | 358/86 |
| 4,977,455 A | 12/1990 | Young | 358/142 |
| 5,065,347 A * | 11/1991 | Pajak et al. | 395/348 |
| 5,151,789 A | 9/1992 | Young | 358/194.1 |
| 5,208,665 A | 5/1993 | McCalley et al. | 358/86 |
| 5,208,745 A | 5/1993 | Quentin et al. | 364/188 |
| 5,317,403 A | 5/1994 | Keenan | 348/731 |
| 5,321,833 A | 6/1994 | Chang et al. | 395/600 |
| 5,353,121 A | 10/1994 | Young et al. | 348/563 |
| 5,390,295 A * | 2/1995 | Bates et al. | 345/362 |
| 5,408,655 A | 4/1995 | Oren et al. | 395/600 |
| 5,410,344 A | 4/1995 | Graves et al. | 348/1 |
| 5,412,776 A * | 5/1995 | Bloomfield et al. | 395/356 |
| 5,414,426 A | 5/1995 | O'Donnell et al. | 341/176 |
| 5,428,731 A | 6/1995 | Powers, III | 395/154 |
| 5,442,771 A | 8/1995 | Filepp, et al. | 395/650 |
| 5,500,929 A * | 3/1996 | Dizkinson | 345/356 |
| 5,500,936 A * | 3/1996 | Allen et al. | 395/352 |
| 5,517,605 A * | 5/1996 | Wolf | 345/326 |
| 5,606,654 A * | 2/1997 | Schuur | 395/356 |
| 5,689,663 A * | 11/1997 | Williams | 345/327 |

* cited by examiner

*Primary Examiner*—Cao H. Nguyen
(74) *Attorney, Agent, or Firm*—Schwegman, Lundberg, Woessner & Kluth, P.A.; Scott Charles Richardson

(57) ABSTRACT

A computer executable program manager is provided which simplifies activating programs from multiple programming sources. Each program identified as a favorite program, regardless of its source, is included in a hierarchy which is organized by program subject matter. The program manager displays a single presentation of the hierarchy of the diverse programs selected from the variety of programming sources. A user is able to easily activate a program included in the hierarchy either manually or automatically. Programs are added to and removed from the hierarchy either manually or automatically based on activation patterns.

21 Claims, 7 Drawing Sheets

FIG. 2

| CLASSIFICATION NAME | PGM1 | PGM2 | PGM3 | PGM4 |
|---|---|---|---|---|
| FINANCE 201 | QUICKEN SHEET 1 220 | CNN 221 | STOCK TICKER 222 | NETSCAPE—FINANCE HOME PAGE 223 |
| SPORTS 202 | ESPN 224 | WWW SPORTS CHAT 225 | NETWORK TELEVISION 226 | ⟨BLANK⟩ 227 |

| PROGRAM EXECUTABLE NAME 320 | DATE LAST ACTIVATED 330 | NUMBER OF ACTIVATIONS IN MEASURING PERIOD 340 |
|---|---|---|
| PROGRAM 1 | 10/5/95 | 3 |
| PROGRAM 2 | 10/8/95 | 1 |
| ... | ... | ... |

310

| PROGRAM EXECUTABLES | DATE LAST ACTIVATED | DATE 1 | DATE 2 | ... |
|---|---|---|---|---|
| 1. QUICKEN.EXE | | | | |
| 2. NETSCAPE.EXE | | | | |
| 3. TCP.EXE | | | | |
| 4. PAGE1.EXE | | | | |
| 5. CABLE CHANNEL 452 | | | | |
| 6. RECORD PROGRAM XYZ | | | | |
| ... | | | | |

METHOD AND APPARATUS FOR MANAGING PROGRAM ACTIVATION THROUGH USE OF A FAVORITE PROGRAM BUTTON MENU

The present application is a continuation-in-part of U.S. pat. application Ser. No. 08/502,882, filed on Jul. 17, 1995 entitled "Context Sensitive Remote Control Groups" which is hereby incorporated by reference.

FIELD OF THE INVENTION

The present invention relates in general to controlling computer program activation, and particularly to a system providing a consistent presentation for selection of multimedia programming.

BACKGROUND OF THE INVENTION

Today's computer user is inundated with multifarious program viewing options. Computer systems have increased in power and speed, enabling an ever-widening array of technical and recreational software. In addition, external programming sources connectable to the computer system, ranging CD ROM devices to external computer networks to broadcast television, have increased the number and variety of available programs. More recently, the advent of fiber optics, increased data rates, more efficient data formats, and related technologies has made the plethora of programming obtainable across a broad spectrum of computer users. One no longer has to be an electrical engineer to connect a computer system to the outside world.

One effect of the overwhelming tide of computer-controlled presentations is that more and more time and effort is required for a user to find the program or programs he or she wishes to run. For each programming source the user has to scan one or more directories for a particular program. In conventional systems, this means that each programming source (television, CD ROM, computer applications) has a separate presentation of the programs available via that particular medium. Each presentation is oriented to its particular programming source and thus no two presentations appear or operate the same. This adds to the time and effort required to activate the desired programs when a user is viewing programs from more than one source.

A partial solution to this problem has been known in the art for some time. By this known method a user encodes a particular button or series of keystrokes to activate a particular program. This method has a number of limitations. There are only a finite number of buttons or keystroke combinations available for user definition. The user can only encode a small (relative to the amount of programming available) number of programs. When the user wants to add one more than the number of buttons or keystrokes available they have to replace an existing coded program with the new one. Where keystrokes are used there is always the risk that the particular pattern of keystrokes will be used by a program to perform a particular task.

Another limitation inherent in encoded buttons or keystroke patterns is that there is no straightforward method of identifying which program is activated by which button or keystroke. The user must either have a very good memory or maintain a separate glossary or index which is manually updated each time a program in added, removed, or reassigned. What is needed is a system which identifies programs from multiple sources as "favorite" based upon their activation patterns, and then uses that information to populate and maintain a single uniform presentation of the diversity of programs.

Another partial solution is embodied in the iconographic structure implemented in systems such as the Windows® and Macintosh® OS7 operating systems. In systems such as these an icon represents a program or group of programs. A program is easily activated by double clicking on the associated icon. This type of system is limited in that a user must manually group individual program icons. There is no way to modify program groupings based on activation patterns, and only one type of programming (in the case of Windows® only programs which have been compiled and linked) can be represented by icons. In a Windows® system the user can cause some programs to automatically start when the system is initialized. This is done by grouping the respective icons in a specially named group. This automatic startup facility retains the limitations inherent in a Windows® environment, and is also limiting in that the specified programs are started every time the system is initialized. Thus, when a user wishes to perform only a specific task on the computer that has nothing to do with the specified programs, he/she still has to wait for all of the automatically started programs to be initialized before he/she can start the task they wanted to perform.

Other existing methods are designed to simplify a user's interaction with individual programs or program sources. One example is "bookmarks" such as those employed in the Internet browser Netscape®. To access a particular location or "page" on the Internet, a user has to work through a series of menus and programmed linkages (referred to as hyperlinks). Rather than requiring the user to recall the path taken to get to a particular location, the application will store, at the users request, the direct address of the page being viewed at the time of the request. The next time the user wants to access that page from within the application all they have to do is display the list of bookmarks (actually the address strings) and select the desired location. Another example of an attempt to simplify user access is an on-line publication of program scheduling such as that employed by Starsight®. This system transmits television program broadcast information such that it can be displayed on the television monitor.

Existing systems have focused on simplifying a user's interaction with individual programs or program sources. Program sources are including directories to or viewing guides of the programs available from that source. These methods tend to be unique to their particular application. For each program source a user accesses, the user has to employ a different and separate means of locating and activating their favorite programs. Any time they want to add, change, or remove a favorite program reference it has to be done manually. There is no single method of managing programs in a uniform presentation that takes into account the varied and changing programming sources and user preferences. A program manager is needed that coordinates user activation of programs from a diversity of programming sources.

SUMMARY OF THE INVENTION

A program manager capable of running on a computer and managing the activation of diverse programs from a variety of programming sources is provided. The program manager allows the user to identify a plurality of subject matter classifications, and then either manually or automatically associate a plurality of favorite programs from any combination of the programming sources with one or more of the subject matter classifications. The program manager stores the subject matter classifications and associated programs in a hierarchical structure. The program manager provides a unified presentation of the favorite programs as associated by subject matter classification and a simplified method of activating a user's favorite programs.

In one embodiment the program manager comprises a computer readable storage device containing program code. The program code, when executed on a computer, causes the computer to perform the steps comprising: organizing a plurality of programs in a hierarchical format, the hierarchy being based on subject matter classification, wherein the plurality of programs is homogeneously grouped in a plurality of subject matter classifications; identifying favorite programs within each subject matter classification; displaying the favorite programs of one subject matter classification; selecting a particular program from the subject matter classification displayed in response to a user command; and activating the selected program.

In another embodiment each program that is not already included as a favorite program in a first subject matter classification and which has been frequently activated by the user concurrently with the first subject matter classification is added as a favorite program to the first subject matter classification. In yet another embodiment each program that is not already included in the subject matter classification and which has been specifically identified as a favorite program by the user is added to the first subject matter classification.

In yet another embodiment the user defines the number of favorite programs that any one subject matter classification can hold at one time. If a new program is added to a subject matter classification that already has the maximum number of favorite programs as defined by the user, the least frequently activated program within that subject matter classification is removed from the subject matter classification.

According to another embodiment of the present invention, each program that is included in a subject matter classification and which has been infrequently activated by the user is removed from the subject matter classification. In another embodiment of the invention each program that is included in a subject matter classification and which has been specifically identified as no longer favorite by the user is removed from the first subject matter classification.

In another embodiment of the present invention the program manager stores a plurality of diverse programs which have been frequently activated by the user in an activation array and automatically activates each of the programs identified in the activation array. In yet another embodiment the plurality of diverse programs is specifically selected by the user to be stored in the activation array.

In still another embodiment of the invention, a computer comprising a monitor, a user input device, and a program manager capable of managing the activation of programs from multiple sources of diverse programming, including video and computer program applications, is provided. The program manager comprises the following: an array storing the individual identifications of diverse programs from the multiple sources of diverse programming in a hierarchical format, the hierarchy being based on a plurality of subject matter classifications, wherein programs from every source of diverse programming are homogeneously classified; a classification selection module for selecting a first subject matter classification based on user input; a display module displaying representations of the diverse programs in the first subject matter classification; and a rotation module for identifying a second subject matter classification as being next in relative order to the first subject matter classification. In another embodiment the input device is coupled to the computer and allows the user to navigate through the displayed identifications to select at least one of the diverse programs to be processed by the computer. According to another embodiment of the invention at least one of the program sources transmits video signals. Such sources include, but are not limited to, RF tranmissions, cable television, satellite television, and VCRs.

In another embodiment of the invention the hierarchy of subject matter classifications and programs is presented to the user as a menu and the user identifies their selection by entering a menu option. In yet another embodiment of the invention the hierarchy of subject matter classifications and programs is presented to the user as a set of icons and the user identifies their selection by selecting one of the icons. In still another embodiment of the invention the hierarchy of subject matter classifications and programs is presented to the user as a list and the user identifies their selection by selecting one of the list elements.

BRIEF DESCRIPTION OF THE DRAWINGS

FIG. 2 is a representation of the contents of a classification array according to one embodiment of the present invention;

FIG. 3 is a representation of the contents of a program activation frequency table according to one embodiment of the invention;

FIG. 10 is a representation of a data structure containing automatic program activation information according to one embodiment of the invention.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present invention. The following detailed description is, therefore, not to be taken in a limiting sense, and the scope of the present invention is defined by the appended claims.

Figure 1:
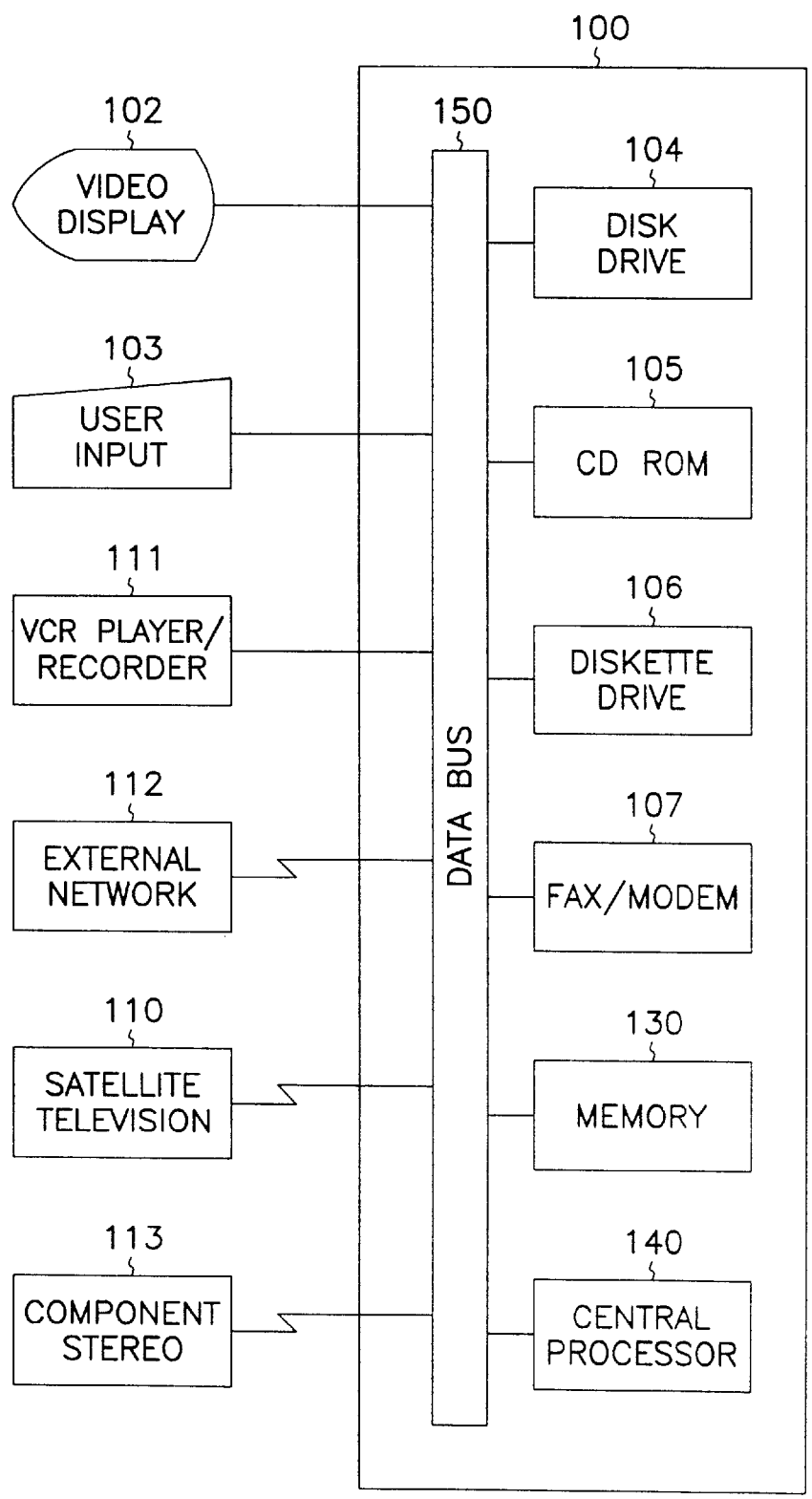
FIG. 1 is a block diagram showing the major components of the computer system as described in one embodiment of the current invention.

FIG. 1 shows the functional elements of a computer system as incorporated into one embodiment of the present invention. Computer 100 comprises a video display 102, memory 130, and a central processor 140 all communicatively coupled to a data bus 150. All of these components are common to personal computers and are not discussed further. Also coupled to the data bus 150 are an external network 112, satellite television 110, and video tape player/recorder 111. Component stereo system 113, which in one embodiment contains a CD player, AM/FM tuner, and a cassette tape deck, is also coupled to the data bus 150. Other embodiments include cable television and broadcast television. Also included in the computer are disk drive 104, CD ROM drive 105, diskette drive 106, and fax/modem 107. All of these components are common to personal computers. User commands are input through a device 103, which in one embodiment is a standard PC keyboard, while in another embodiment the device 103 is a pointing device such as a mouse. In one embodiment, processor 140 is a 133 mhz Pentium processor, RAM 130 comprises a minimum of 16 megabytes, disk drive 104 is a 1.5 gigabyte IDE hard drive, the CD ROM drive 105 is a quad speed, 3 disc changer, and the fax/modem 107 is a standard 28.8 kbits per second modem. Diskette drive 106 accepts 3.5 inch removable storage media which can be read from and written to by the computer. Video display 102 is generally a large screen monitor of either VGA, high definition television, NTSC compatible, or other types of displays having screens capable of displaying video signals as defined herein. It should be noted that components in personal computers are getting faster, smaller and cheaper with higher capacity. It is easily anticipated that larger memories and faster modems and processors will be preferable over the next 20 plus years.

In one embodiment of the present invention program code for a program manager is embodied on a computer readable storage device. The storage device may be a removable diskette compatible with diskette drive 106, a CD readable by CD ROM drive 105, or any other type of removable media which can be read by a computer. The program code may also be transmitted over telephone lines or via satellite signals such that the program manager program code is recorded on a computer readable storage device, for example disk drive 104. The program code is written in any suitable programming language and compiled such that it is executable by a computer, using processes well-known in the art.

The computer 100 further comprises an operating system such as Windows 95 and contains circuitry and software to process audio and video signals from the various programming sources. In one embodiment some or all of the functions of the program manager are integrated into the operating system. In a further embodiment, the program manager in an application running on the operating system. Incoming audio/video signals are transmitted to computer 100 via coaxial cable or other suitable communications medium for further processing. Other audio/video programming may be provided by an external network 112, where incoming signals are transmitted to the computer 100 over a transmission medium such as twisted pair, coax, fiber optic cable, radio frequency (RF) waves, or any other suitable means of transmitting audio and video signals. Audio/video programming is also provided by programs run on the computer system 100.

FIG. 2 shows one embodiment of how diverse programs are stored in a classification array 200 in the computer memory 130. The classification array logically consists of rows of associated elements. A row (referred to as a classification) is assigned a classification name 201, 202. In one embodiment the user assigns the classification name 201, 202 when the classification is first created as described below. According to one embodiment of the present invention, when a program is associated with a classification as described below, the command or commands required to activate the program is/are stored in the first available element 220, 221, 222, 223, 224, 225, 226, 227 (hereinafter referred to as 220–227) in the selected classification 201, 202. The classification array 200 is adjustably sized based on the number of subject matter classifications and elements created.

Several of the program manager's functions are triggered when a given program has been 'frequently' activated. A program is considered activated if the user watches or listens to the program for more that a set period of time. The period of time is modifiable by the user in order to fit their pattern of usage. In one embodiment the period is five minutes. This period is provided in order to allow a user to 'surf through channels without actually flagging them as activated. The program manager also maintains a measuring period value which is used to calculate frequency of use. In one embodiment the value of the measuring period is set to 24 hours. The user has the option of modifying the measuring period value to more closely represent the user's particular pattern of use.

The program manager stores activation frequency information in a data structure such as that indicated in FIG. 3. Each time a program is activated the program manager checks the frequency table 310 for an entry for that program. Each entry in the program executable column 320 is compared to the name of activated program. If a match is found, the current date and time is compared to the date and time in the 'date last activated' column 330 of the corresponding row. In addition, the time and date of each activation of each program is stored in a log. If the difference between the current date and time and the date and time in the 'date last activated column 330 is greater than the measuring period the number in the 'Number of Activations in Measuring Period'340 for that program executable is set to 1. If less than the measuring period, the number of entries in the log for that program executable between the two times is counted, and that value is set in column 340. In either event the 'date last activated'330 column is set equal to the date and time of the most recent activation. If no match is found for the executed program in the table, a new entry is made in the table, with the 'date last activated'330 field set equal to the date and time of the most recent activation by the program manager and the 'Number of Activations in Measuring Period'340 field set to 1. The program manager employs the 'date last activated'330 and 'Number of Activations in Measuring Period'340 values to identify frequently activated programs. The determination of 'frequently' is modifiable to fit the particular user's activation patterns. 'Frequently' is, in one embodiment, defined as being activated five days in a row.

Figure 4:
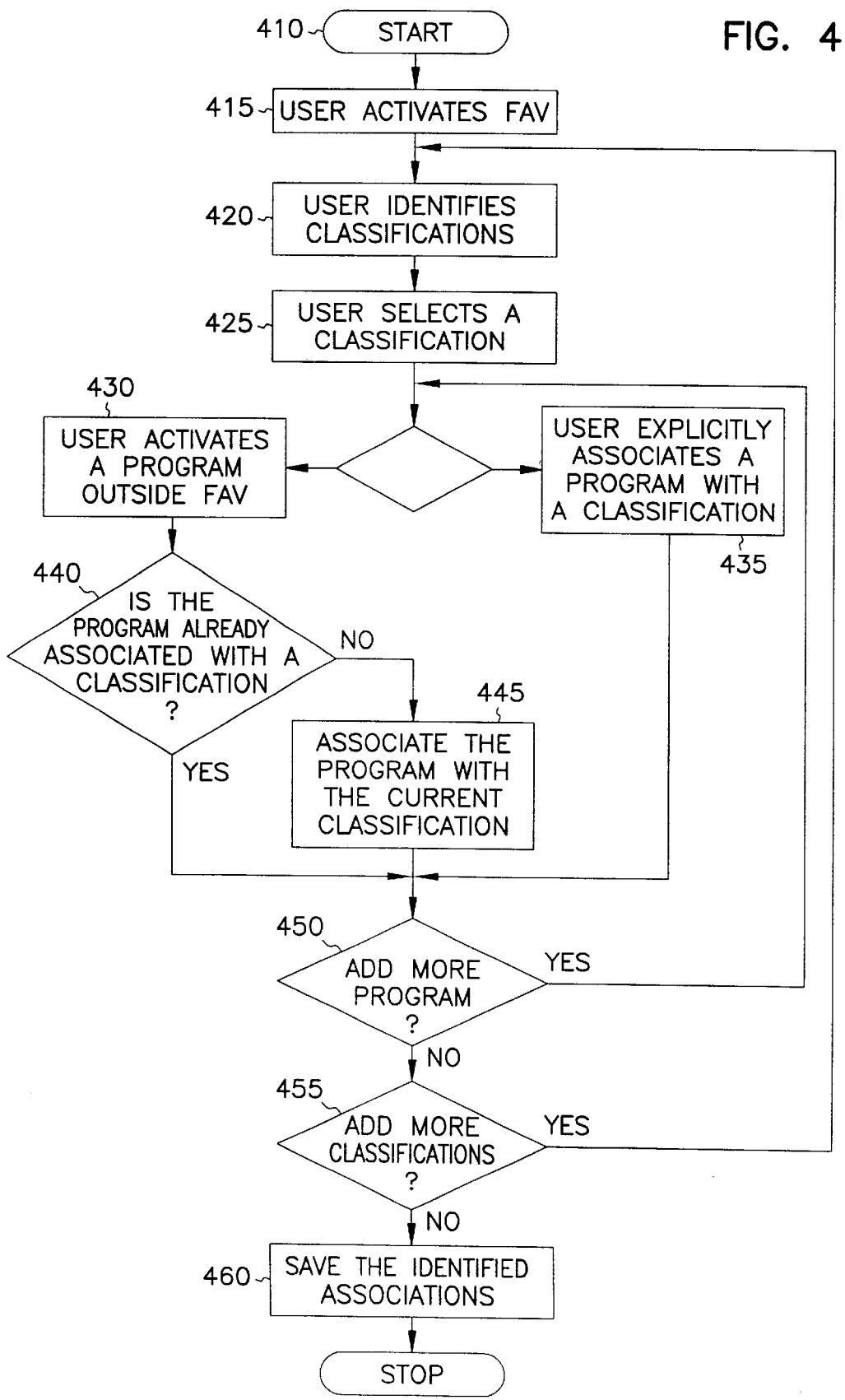
FIG. 4 is a high level flow diagram showing how programs are associated with subject matter classifications according to one embodiment of the present invention.

FIG. 4 shows one embodiment of the process by which programs are associated with a particular classification. The program is initialized by the computer 410. When the program manager is activated 415 the user has the option to identify new subject matter classifications and/or modify the name or description of existing subject matter classifications 420. The user then selects one of the subject matter classifications 425. A program may be associated with a classification in a number of ways. In one method, the user may explicitly associate a particular program with a particular classification 435 using the conventional drag-and-drop technique to drop an iconized representation of the application, such as those in a standard Windows® grouping, onto the selected classification. In a second method, performed automatically by the program manager, a program the user frequently activates when the program manager is executing is added 430. The computer checks to see if the program has been associated with a classification 440. If it has not the computer associates the program with the currently-selected classification 445. In one embodiment, the user is presented with a choice of whether or not to add the program to a classification. The computer stores all additions and modifications made to the subject matter classifications. If the user wants to add more programs to the hierarchy 450 within the same class he/she either selects another program id or activates another program. The use may add another program to the same or a different classification 415. The user may also add another classification 455. Before the program exits all changes are saved in the computer's non-volatile memory 460 such that the user's configuration is retained even when the computer is turned off or loses power.

Figure 5:
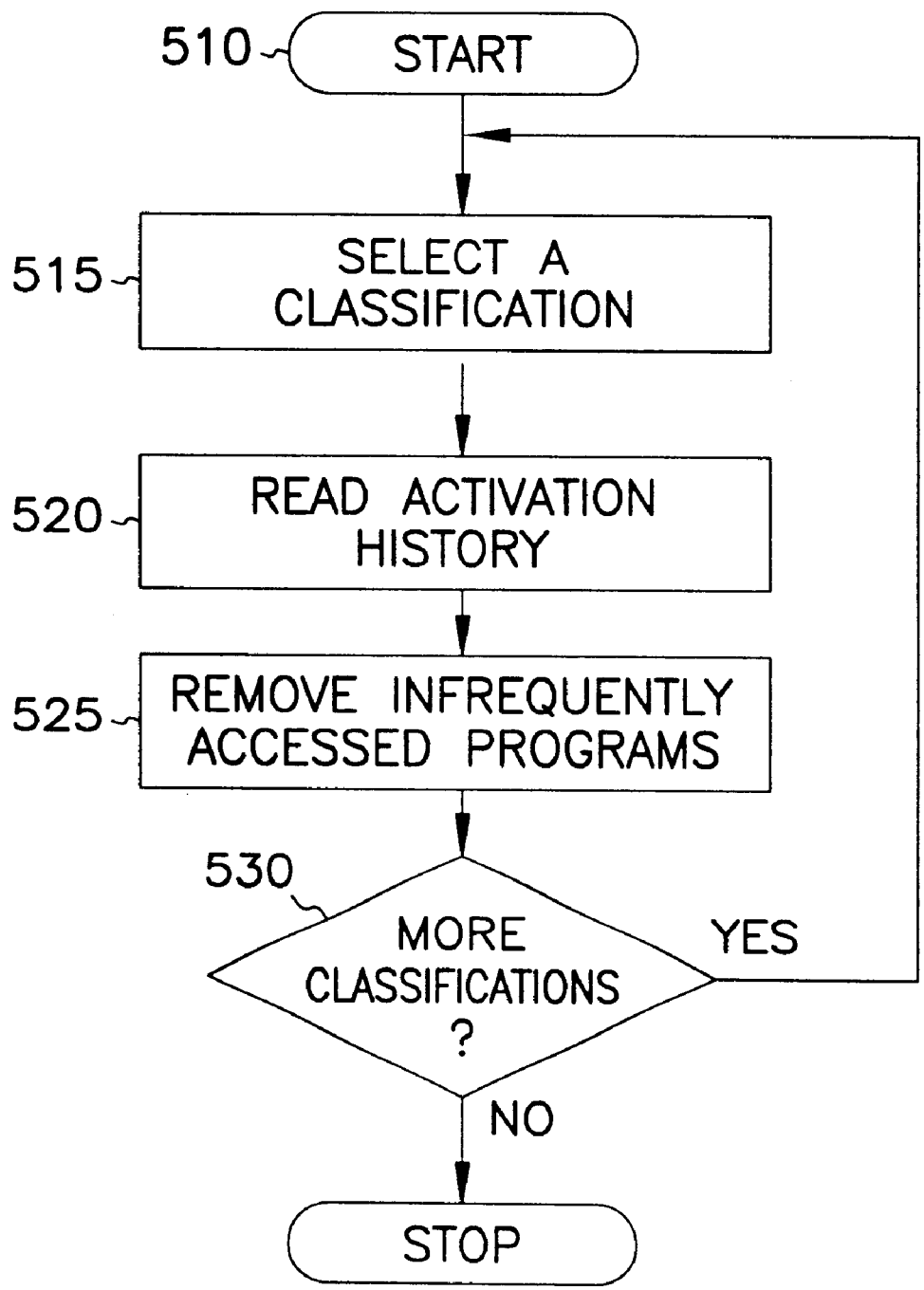
FIG. 5 is a high level flow diagram showing how programs are removed from subject matter classifications according to one embodiment of the present invention.

FIG. 5 shows one embodiment of the process by which programs are removed from a classification. When the program manager is activated 510 by the computer the program manager selects the first subject matter classification 515 and reviews the activation history of all programs within that classification 520. Each program which has been infrequently activated is brought to the attention of the user, either on a periodic basis, such as weekly or monthly, or each time the computer is powered on. The user is presented with the opportunity to approve of disapprove removal of the program from the classification list 525. A user may also identify particular programs to be retained in the classification regardless of the frequency of use. 'Infrequently' is, in one embodiment, defined as no activations for seven concurrent days. The algorithm used to determine 'infrequent' activation is modifiable to fit the particular user's activation patterns. This process is repeated for each classification 530.

Figure 6:
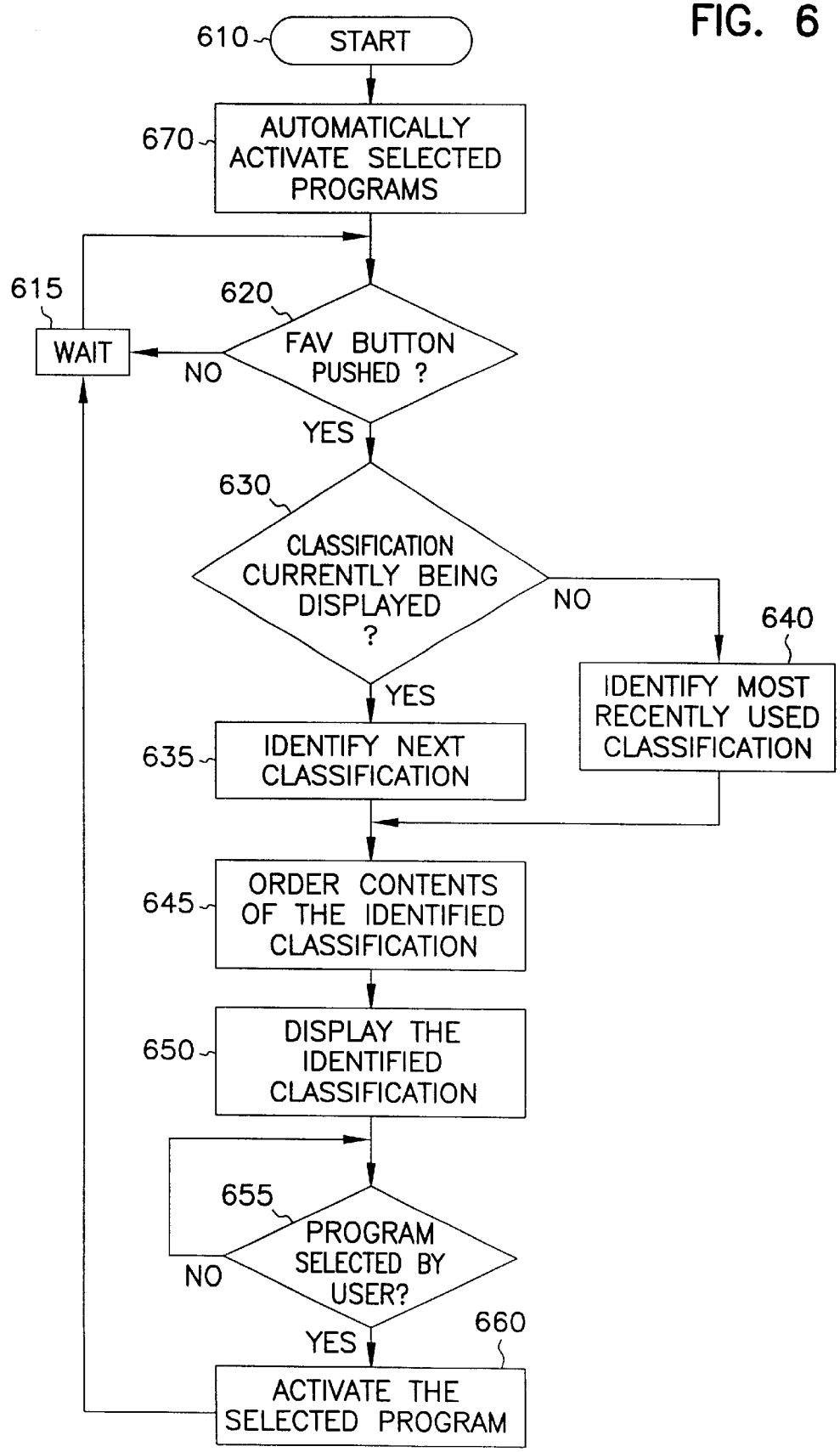
FIG. 6 is a high level flow diagram showing how the program manager processes program selection commands according to one embodiment of the present invention.

FIG. 6 shows one example of the process by which a particular program is selected by the user and activated by the program manager. The program manager is activated by the computer 610, triggering the automatic activation module 670. The automatic activation module 670 activates any programs listed in the data structure shown in FIG. 10 and which is described further below. The program manager waits 615 until the program representation (FAV button) is selected 620. The program manager then executes the classification selection module which contains program blocks 630, 635, 640. The first program block 630 determines whether the contents of a classification are being displayed on the monitor at the present time. When FAV is selected and a classification is not being displayed at the time the program manager identifies which of the subject matter classifications was the most recently displayed 640. When a classification is being displayed at the time when the FAV icon is selected the program manager executes a rotation module 635 which identifies which classification is the next to be displayed.

After a classification is selected to be displayed, the program manager executes a display module comprising program blocks 645 and 650. The program code of program block 645 causes the computer to order the contents of the identified classification. Classification contents may also be ordered in a number of ways, including but not limited to: alphabetically, in the sequence they were entered, or by frequency of use. After the classification contents have been sorted the classification and its contents are displayed by the computer 650. The user selects one of the program representations from the display 655 and the computer activates the selected program 660.

Figure 7:
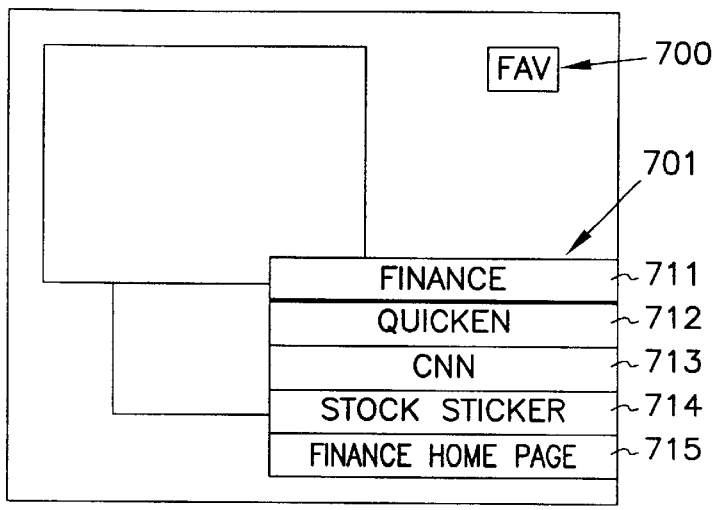
FIG. 7 is a block diagram illustrating the contents of a program classification displayed as a list according to one embodiment of the current invention.

In one embodiment, pictured in FIG. 7, the classification contents are displayed as a list 701 and the FAV representation 700 as a separate icon. The classification is identified at the top of the list 711 and representations of the available programs associated with the identified classification 712, 713, 714, 715 are displayed in order of access frequency. The user highlights one of the program representations, and when the user presses the transmit key the program manager causes the computer to activate the selected program.

Figure 8:
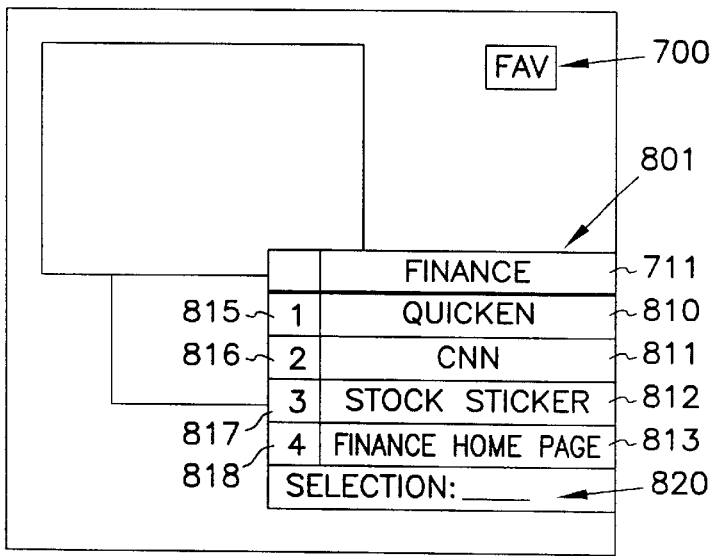
FIG. 8 is a block diagram illustrating the contents of a program classification displayed as a menu according to one embodiment of the current invention.

In another embodiment, pictured in FIG. 8, the classification contents are displayed as a menu 801 and the FAV representation 700 as a separate icon. The menu 801 provides the classification name as well as representations of the available programs associated with the classification. The program representations 810, 811, 812, 813 each have a unique menu identifier 815, 816, 817, 818. The user either highlights one of the menu identifiers 815, 816, 817, 818 or enters one of the menu identifiers 815, 816, 817, 818 in a menu selection field 820. When the user presses the transmit key the program manager causes the computer to activate the program represented by the selected menu identifier.

Figure 9:
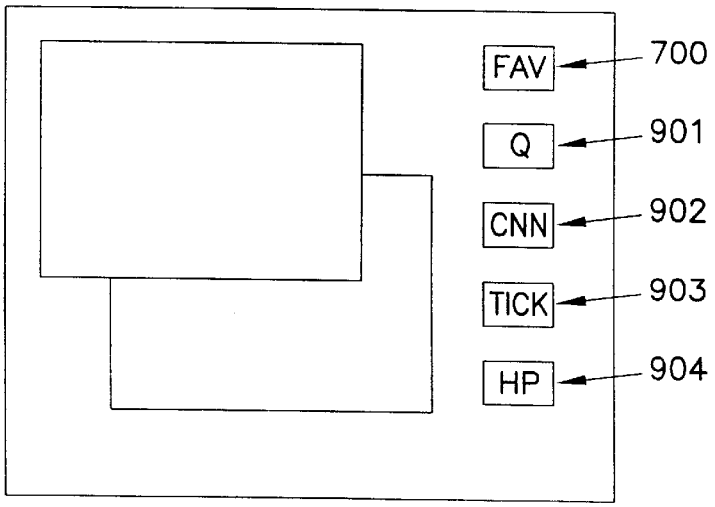
FIG. 9 is a block diagram illustrating the contents of a program classification displayed as a set of icons according to one embodiment of the current invention.

In yet another embodiment, pictured in FIG. 9, the representations of the available programs within the current classification and the FAV representation are displayed as separate icons 901, 902, 903, 904, 700. The user either highlights one of the icons and presses the transmit key or double clicks on one of the icons 901, 902, 903, 904. The program manager then causes the computer to activate the program represented by the selected icon.

In another embodiment, programs are automatically activated when the program manager is started. In one such embodiment the user can specify which programs, regardless of subject matter classifications, are to be activated when the program manager is activated. By dragging and dropping program icons 901, 902, 903, 904 to a favorite start icon the user selects programs to be stored in a data structure such as that shown in FIG. 10. The executables for several programs are shown in the data structure 1010. Some are merely started and placed in a window. Others, such as a favorite page on the World Wide Web require several programs to be started, and an address to be supplied as indicated by the PAGE1 executable, which simply provides a web address to Netscape®, following successful connection to an internet provider by the TCP executable. Using a similar executable in line 6, a television program id, for example a continuing series that is broadcast while the user is working, is sensed on channel 452 and recorded by video tape player 111. When the program manager is initialized it automatically starts all programs identified in that data structure. In another embodiment, the ten most accessed programs, regardless of classification, are automatically activated when the program manager is activated. In this embodiment, the programs are stored in the data structure based on a usage algorithm. The algorithm can be modified to match the users activation patterns. The prior embodiment presents a known, consistent set of active programs when the program manager comes on line. The latter embodiment presents a fluid set of active programs based on prior use.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computer readable storage device having program code embodied therein for causing a computer to perform the steps comprising:

organizing a diverse plurality of programs into homogeneous groups based on a plurality of subject matter classifications constituting a hierarchy wherein each program is executed independently of the program code that organizes the hierarchy identifying a plurality of the programs within each subject matter classification as favorite programs;

displaying a representation of each of the favorite programs within a subject matter classification;

selecting one of the favorite program representations in response to a user command; and activating the program indicated by the selected representation.

2. The storage device of claim 1 and further causing a computer to perform the step of displaying a representation of a program that has been frequently activated by the user as a favorite program.

3. The storage device of claim 1 and further causing a computer to perform the step of adding a program specifically identified as a favorite program by the user as a favorite program.

4. The storage device of claim 1 and further causing a computer to perform the step of adding to a subject matter classification for each program that is not already identified as a favorite program and which is specifically identified as a favorite program by the user and, for each program so added, deleting from the subject matter classification the least activated program.

5. The storage device of claim 1 and further causing a computer to perform the step of removing from a subject matter classification each program that is identified as a favorite program and which has been infrequently activated by the user.

6. The storage device of claim 1 and further causing a computer to perform the step of removing from a subject matter classification each program that is identified to be deleted.

7. The storage device of claim 1 and further causing a computer to perform the steps of:

storing an identification for each of a plurality of diverse programs which have been frequently activated by the user in an activation array; and automatically activating each of the programs identified in the activation array.

8. The storage device of claim 1 and further causing a computer to perform the steps of:

storing an identification for each of a plurality of diverse user-selected programs in an activation array; and automatically activating each of the programs identified in the activation array.

9. A computer comprising a monitor, a user input device, and a program manager capable of managing the activation of programs from multiple sources of diverse programming, including video and computer program applications, the program manager comprising:

an array storing the individual identifications of diverse programs from the multiple sources of diverse programming into homogeneous groups based on a plurality of subject matter classifications constituting a hierarchy wherein each program is executed independently of the program manager a classification selection module for selecting a first subject matter classification based on user input;

a display module displaying representations of the diverse programs grouped in the first subject matter classification; and a rotation module for identifying a second subject matter classification as being next in relative order to the first subject matter classification.

10. The computer of claim 9 wherein the user input device provides for navigating through the displayed representations and selecting at least one of the diverse programs to be processed by the computer.

11. The computer of claim 9 wherein at least one of the sources of diverse programming transmits video signals.

12. The computer of claim 9 wherein the program manager further comprises an add module for adding a program identification to the array for each program that is not already represented in the array and which has been frequently activated.

13. The computer of claim 9 wherein the program manager further comprises an add module for adding a program identification to the array for each program identified by a user as a favorite program.

14. The computer of claim 9 wherein the program manager further comprises an add module for adding a program identification to the array for each program identified as a favorite program and, for each program added, deleting from the array a least frequently activated program.

15. The computer of claim 9 wherein the program manager further comprises a delete module for deleting a program identification from the array for each program which has been infrequently activated.

16. The computer of claim 9 wherein the program manager further comprises a remove module for removing a program identification from the array each program identified by a user as removable.

17. The computer of claim 9 wherein the program manager further comprises an automatic activation module for automatically activating a plurality of diverse programs which have been frequently activated by a user.

18. The computer of claim 9 wherein the program manager further comprises an automatic activation module for automatically activating each of the programs which have been previously identified by a user.

19. The program manager of claim 9 wherein the representation of the hierarchy is a menu and a user identifies their selection by entering a menu option.

20. The program manager of claim 9 wherein the representation of the hierarchy is a set of icons and a user identifies their selection by selecting one of the icons using the user input device.

21. The program manager of claim 9 wherein the representation of the hierarchy is a list and a user identifies their selection by selecting one of the list elements using the user input device.

* * * * *